(12) United States Patent
Kasama et al.

(10) Patent No.: US 6,376,827 B1
(45) Date of Patent: Apr. 23, 2002

(54) NEAR FIELD OPTICAL MEMORY HEAD

(75) Inventors: Nobuyuki Kasama; Yasuyuki Mitsuoka; Norio Chiba; Takashi Niwa; Kunio Nakajima; Manabu Oumi; Kenji Kato; Masataka Shinogi, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/403,406

(22) PCT Filed: Feb. 22, 1999

(86) PCT No.: PCT/JP99/00781

§ 371 Date: Feb. 14, 2000

§ 102(e) Date: Feb. 14, 2000

(87) PCT Pub. No.: WO99/44198

PCT Pub. Date: Sep. 2, 1999

(30) Foreign Application Priority Data

| Feb. 25, 1998 | (JP) | 10-043715 |
| Feb. 25, 1998 | (JP) | 10-043718 |
| Jan. 11, 1999 | (JP) | 11-004548 |
| Jan. 13, 1999 | (JP) | 11-006802 |

(51) Int. Cl.[7] .............................................. G11B 13/00

(52) U.S. Cl. ....................... 250/216; 369/112; 369/121; 250/201.5; 250/306

(58) Field of Search ........................... 250/201.5, 234, 250/216, 227.11; 369/13, 14, 112, 121, 122

(56) References Cited

U.S. PATENT DOCUMENTS

| 4,725,727 A | 1/1988 | Harder et al. ................ 250/227 |
| 5,294,790 A | 3/1994 | Ohta et al. ................... 250/216 |
| 5,354,985 A | 10/1994 | Quate .......................... 250/234 |
| 5,982,716 A | * 11/1999 | Kino et al. ..................... 369/14 |
| 6,046,972 A | 1/2000 | Kuroda et al. ............... 369/126 |
| 6,084,848 A | * 7/2000 | Goto ........................... 369/121 |

FOREIGN PATENT DOCUMENTS

| EP | 535611 | | 4/1993 |
| EP | 797117 | | 9/1997 |
| JP | 8-106646 | * | 4/1996 |
| JP | 9-231608 | * | 4/1996 |
| JP | 08 103361 | | 10/1997 |
| WO | WO 95/03561 | | 2/1995 |

* cited by examiner

Primary Examiner—Stephone Allen
(74) Attorney, Agent, or Firm—Adams & Wilks

(57) ABSTRACT

There is provided a near-field optical memory head for recording and/or reproducing information on a recording medium by utilizing near-field light which is a near-field optical memory head having a compact constitution and is suitable for mass production and array formation. According to the near-field optical memory head 11, in a planar substrate formed by penetrating at least one hole in a shape of an inverted pyramid such that a top portion thereof constitutes a very small aperture 4, a near-field light forming system for forming near-field light at a recording medium 1 and a near-field light detecting system for guiding propagating light 10 provided by interactively operating the formed near-field light with the very small aperture 4 to a light detecting element are integrated.

36 Claims, 13 Drawing Sheets

NEAR FIELD OPTICAL MEMORY HEAD

TECHNICAL FIELD

The present invention relates to an optical memory head for carrying out reproduction and/or recording of high density information by utilizing near-field light.

BACKGROUND OF THE INVENTION

There has been used a scanning type probe microscope (SPM) such as a scanning type tunnel microscope (STM) or an atomic force microscope (AFM) for observing a very small region on the order of a nanometer on a surface of a sample. In the SPM, an image having a resolution dependent on a shape of a front end of a probe can be obtained by scanning the probe having a sharpened front edge above a surface of a sample with an interaction of tunnel current, atomic force or the like caused between the probe and the surface of the sample as an object of observation, however, a restriction imposed on the sample to be observed is comparatively severe.

Hence, at the present time, great attention has been given to a near-field optical microscope enabling observation of a very small region on a surface of a sample by using as an object of observation an interaction caused between near-field light formed at the surface of the sample and a probe by utilizing the propagating light.

According to a near-field optical microscope, propagating light is illuminated on a surface of a sample to thereby generate near-field light, the generated near-field light is scattered by a probe having a sharpened front end and the scattered light is processed similar to conventional propagating light detection by which a limit of a resolution of observation by a conventional optical microscope is exceeded and observation of a smaller region is made feasible. Further, by sweeping the wavelength of the light illuminated onto the surface of the sample, observation of optical physical properties of the sample in a very small region is also made feasible.

In the case of a near-field optical microscope, there is frequently used an optical fiber probe provided with a very small aperture at its front end and fabricated by sharpening an optical fiber and coating a surrounding thereof by a metal and scattered light produced by operating the optical fiber probe interactively with near-field light which is made to pass through an inner portion of the optical fiber probe and guided to an optical detector.

Further, observation of a surface can also be carried out by introducing light to a sample via an optical fiber probe to thereby generate near-field light at a very small aperture of the optical fiber probe and guiding scattered light generated by an interaction between the near-field light and a fine structure of a surface of the sample to an optical detector by using a focusing system added further.

Further, near-field light is not only utilized for a microscope but is applicable to high density optical memory recording in which near-field light having a high energy density is generated at a very small aperture of an optical fiber probe by introducing light having a comparatively large intensity to a sample via an optical fiber probe so that a structure or physical properties of a surface of the sample are locally changed by the near-field light.

As a probe used in a near-field optical microscope, for example, as disclosed in U.S. Pat. No. 5,294,790, there has been proposed a cantilever type optical probe in which a silicon substrate is formed with an aperture portion penetrating the substrate by semiconductor fabrication technologies of photolithography, etching, and so on, an insulating film is formed at one face of the silicon substrate and an optical waveguide layer having a conical shape is formed on an insulating film on the side opposed to the aperture portion. According to the cantilever type optical probe, an optical fiber is inserted into the aperture portion and light can be transmitted through a very small aperture formed by coating a metal film to other than a front end portion of a light guiding layer.

Further, there has been proposed use of a planar probe having no sharpened front edge as in the above-described probe. According to the planar probe, an aperture having a structure of an inverted pyramid is formed in a silicon substrate by anisotropic etching, particularly, an apex thereof is provided with a diameter of several tens of nanometers and penetrates the silicon substrate. According to such a planar probe, formation of a plurality thereof on the same substrate by using semiconductor fabrication technologies, that is, array formation is facilitated, particularly, the planar probe can be used as an optical memory head suitable for reproduction and recording of an optical memory utilizing near-field light.

However, the optical fiber probe is provided with the sharpened front end and accordingly, the mechanical strength is not sufficient, which is not suitable for mass production and array formation. Further, scattered light provided by disturbing near-field light is very weak and therefore, when the scattered light is detected after passing through an optical fiber, there is needed a device for providing a sufficient light amount at a detecting unit. Further, when a sufficient magnitude of near-field light is generated by passing through an optical fiber, there is needed a device for focusing light to a very small aperture portion of the optical fiber.

Further, according to the cantilever type optical probe, reception of scattered light from the light guiding layer and introduction of propagating light to the light guiding layer are achieved by inserting an optical fiber to the aperture portion and therefore, a sufficient light amount cannot be transmitted with no loss between the light guiding layer and the optical fiber.

According to the cantilever type optical probe, array formation, particularly array formation of a two-dimensional arrangement is difficult to realize. Further, an object of these was originally for use in a microscope and accordingly, no consideration was given to recording or reproduction of information in an optical memory and high speed sweep on a recording medium is difficult.

However, when the optical fiber probe, the cantilever type optical probe and the planar probe are used as optical memory heads, these probes are utilized only for either one of information recording and information reproduction as a premise. For example, when the optical fiber probe is used for recording information onto a recording medium, in order to reproduce information recorded on the recorded medium, there is needed a near-field light generating system for generating near-field light at a recording medium and a near-field light detecting system for scattering the generated near-field light and guiding the scattered light to an optical detector. Therefore, in order to realize high density information recording and reproduction by using such a probe, the constitution of the apparatus becomes complicated and the cost is also increased.

Further, when the optical fiber probe, the cantilever type optical probe and the planar probe are used as optical memory heads for reproducing information recorded on a recording medium, it is a normal practice that these probes are utilized only for either one of near-field light generating use for generating near-field light at a recording medium and near-field light detecting use for scattering the generated near-field light and guiding the scattered light to an optical detector and it is difficult to realize reproduction of information by use of only the probes of these types.

Further, according to the planar probe, in a state in which the very small aperture is made to proximate to a recording medium, sufficient space is not provided between the vicinity of the very small aperture and the recording medium and accordingly, there cannot be utilized near-field light of a reflected type for generating near-field light similarly at a surface of the recording medium by irradiating light to the surface of the recording medium.

Accordingly, it is an object of the invention to provide a near-field optical memory head having a compact constitution and suitable for mass production for realizing recording and reproduction of information of an optical memory utilizing near-field light. Further, it is another object thereof to provide a structure and means for easily taking out an optical signal.

DISCLOSURE OF THE INVENTION

According to a first aspect of the invention, there is provided a near-field optical memory head characterized as a near-field optical memory head for reproducing information on a recording medium by utilizing near-field light, the near-field optical memory head comprising a planar substrate formed by penetrating at least one hole in a shape of an inverted pyramid such that a top portion thereof constitutes a very small aperture, a light waveguide path formed in the planar substrate and a light source for making light incident on the light waveguide path, wherein one end portion of the light waveguide path is disposed at a side edge portion of the planar substrate and other end portion of the light waveguide path is disposed at an aperture edge portion of the very small aperture.

Therefore, formation of the near-field light by irradiating light from the side portion of the substrate to the recording medium via the light waveguide path and taking-out of the propagating light generated by the interaction of the formed near-field light and the very small aperture can be realized on the same substrate.

Further, according to another aspect of the invention, there is provided a near-field optical memory head, wherein the one end portion of the light waveguide path is disposed at an upper face portion of the planar substrate and a reflective layer for reflecting light passing through the light waveguide path is further formed at a portion of an inner side face of the light waveguide path.

Therefore, formation of the near-field light by irradiating light from the upper face of the substrate to the recording medium via the light waveguide path and taking-out of the propagating light generated by the interaction of the formed near-field light and the very small aperture can be realized on the same substrate.

Further, according to another aspect of the invention, there is provided a near-field optical memory head characterized in a near-field optical memory head for reproducing information of a recording medium by utilizing near-field light, the near-field optical memory head comprising a planar substrate formed by penetrating at least one hole in a shape of an inverted pyramid such that a top portion thereof constitutes a very small aperture, diffraction gratings formed on the planar substrate and at an edge portion of the hole and a light source for making illumination light incident on the diffraction gratings, wherein the diffraction gratings guide the illumination light to an aperture edge portion of the very small aperture via the planar substrate, the planar substrate comprises a material of transmitting the illumination light and a light shielding layer is formed at a surface of the very small aperture for emitting the illumination light except the aperture edge portion.

Therefore, formation of the near-field light by irradiating light from the upper face of the substrate to the recording medium via the diffraction gratings and taking-out of the propagating light generated by the interaction of the formed near-field light and the very small aperture can be realized on the same substrate.

Further according to another aspect of the invention, there is provided the near-field optical memory head characterized in a near-field optical memory head for reproducing information of a recording medium by utilizing near-field light, the near-field optical memory head comprising a planar substrate formed by penetrating at least one of holes in a shape of an inverted pyramid such that top portions thereof constitute very small apertures, diffraction gratings formed at a side end portion of the planar substrate and a light source for making illumination light incident on the diffraction gratings, wherein the diffraction gratings guide the illumination light to aperture edge portions of the respective very small apertures via the planar substrate, the planar substrate comprises a material for transmitting the illumination light and a light shielding layer is formed on surfaces of the respective very small apertures for emitting the illumination light except the aperture edge portions.

Accordingly, formation of the near-field light by irradiating light from the side face of the substrate to a plurality of different positions of the recording medium via the diffraction gratings and taking-out of the propagating light generated by the interaction of the formed near-field light and the very small aperture can be realized on the same substrate.

Further, according to another aspect of the invention, there is provided a near-field optical memory head characterized in a near-field optical memory head for recording and/or reproducing information of a recording medium by utilizing near-field light, the near-field optical memory head comprising a planar substrate formed by penetrating at least one hole in a shape of an inverted pyramid such that a top portion thereof constitutes a very small aperture, a light waveguide path formed along a side face of the hole in a depth direction, and light detecting means formed at one end portion of the light waveguide path, wherein other end portion of the light waveguide path is disposed at an aperture edge portion of the very small aperture and a light shielding layer is formed on a surface of the light waveguide path except the other end portion.

Therefore, introduction of the light waveguide path and reception at the light detecting means of the propagating light generated by interaction of the near-field light formed by irradiating light to the very small aperture and the recording medium, can be realized on the same substrate.

Further, according to another aspect of the invention, there is provided a near-field optical memory head characterized in a near-field optical memory head for recording and/or reproducing information of a recording medium by utilizing near-field light, the near-field optical memory head comprising a planar substrate formed by penetrating at least one hole in a shape of an inverted pyramid such that a top portion thereof constitutes a very small aperture, a lens formed at an aperture edge portion of the very small aperture, and light detecting means formed on an optical axis of the lens and on the planar substrate, wherein the planar substrate comprises a material of transmitting light and a light shielding layer is formed on a surface thereof except the lens portion.

Therefore, condensing by the lens and reception by the light detecting means of the propagating light generated by the interaction of the near-field light generated by irradiating light to the very small aperture and the recording medium can be realized on the same substrate.

Further, according to another aspect of the invention, there is provided a near-field optical memory head characterized in a near-field optical memory head for recording and/or reproducing information of a recording medium by utilizing near-field light, the near-field optical memory head comprising a planar substrate formed by penetrating at least one hole in a shape of an inverted pyramid such that a top portion thereof constitutes a very small aperture, wherein the planar substrate includes light detecting means at an aperture edge portion of the very small aperture and a light shielding layer is formed on a surface thereof except the light detecting means portion.

Therefore, reception by the light detecting means of the propagating light generated by the interaction of the near-field light generated by irradiating light to the very small aperture and the recording medium can be realized on the same substrate.

Further, according to another aspect of the invention, there is provided a near-field optical memory head for recording and/or reproducing information of a recording medium by utilizing near-field light, wherein near-field light forming means having a very small aperture portion for forming near-field light on the recording medium and near-field light detecting means for detecting the formed near-field light are provided on a same substrate and the substrate (hereinafter, referred to as a near-field light substrate) is constituted to project from a substrate at an outer peripheral portion.

Therefore, reception by the light detecting means of the propagating light generated by the interaction of the near-field light formed by irradiating light to the very small aperture and the recording medium, can be realized on the same substrate, further, the near-field optical memory head can easily approach the recording medium and an output signal can easily be taken out from an output terminal.

BEST MODE FOR CARRYING OUT THE INVENTION

A detailed explanation will be given of embodiments of a near-field optical memory head according to the invention in reference to the drawings.

[Embodiment 1]

Figure 1:
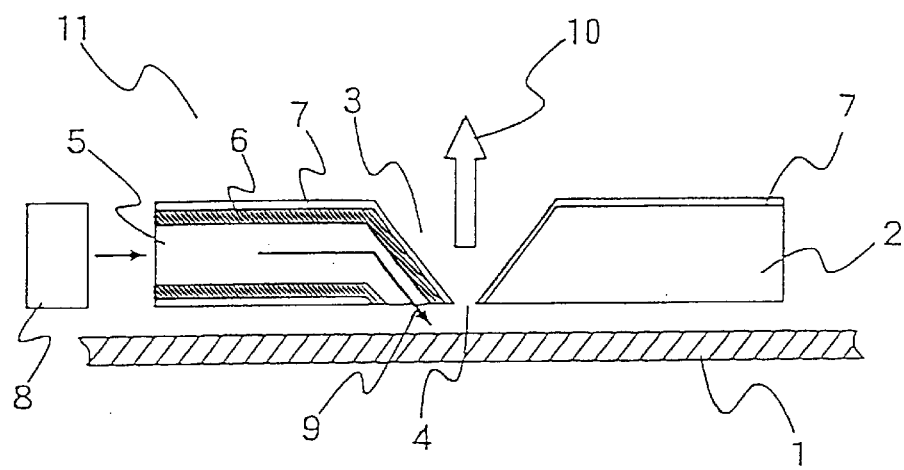
FIG. 1 is a sectional view of a near-field optical memory head according to Embodiment 1 of the invention.

FIG. 1 shows a sectional view of a near-field optical memory head according to Embodiment 1 of the invention. According to a near-field optical memory head 11 of FIG. 1, a silicon substrate 2 is formed such that a tapered aperture portion 3 penetrating the substrate is provided with a very small aperture 4. The very small aperture 4 is provided with a diameter of, for example, several tens of nanometers such that the very small aperture 4 operates interactively with near-field light generated at a vicinity of the very small aperture 4 and propagating light 10 provided as a result thereof can be taken out. In this case, an optical waveguide path comprising a core 5 and a clad 6 is formed at a portion of an aperture edge portion of the tapered aperture portion 3. According to the optical waveguide path, one end face (light incident face) thereof constitutes an end face of the near-field optical memory head 11, and the other end face (light emitting face) is disposed at the aperture edge portion of the very small aperture 4 and illumination light 9 incident on the light incident face of the core 5 by a light source 8 is guided toward the vicinity of the very small aperture 4 and projected onto a sample 1. Further, a light shielding layer 7 for optically shielding the illumination light 9 passing through the inside of the optical waveguide path is formed on surfaces of the silicon substrate 2 and the tapered aperture portion 3.

The tapered aperture portion 3, the core 5 and the clad 6 are formed by micromachining using photolithography, silicon anisotropic etching or the like in, for example, a semiconductor fabrication process. Further, the light shielding layer 7 is a film formed of a metal such as, for example, Au/Cr etc. and is provided by sputtering or vacuum deposition. Further, the light source 8 may be arranged directly on the light incident face as, for example, a surface emitting laser. Further, the light shielding layer 7 can be omitted when the silicon substrate 2 is provided with light shielding performance sufficiently for the wavelength of the illumination light 8.

Next, an explanation will be given of a method of arranging the near-field optical memory head 11, explained above, on a recording medium 1 and carrying out information reproduction at the very small aperture 4.

In this case, the recording medium 1 is a plane substrate, for example, in a shape of a circular disk and the near-field optical memory head 11 is arranged at an upper face thereof. The very small aperture 4 and the recording medium 1 need to be proximate to each other to the degree of a diameter of the very small aperture 4 in order to operate the very small aperture 4 of the near-field optical memory head 11 interactively with near-field light generated at a vicinity of the very small aperture 4. Hence, a lubricant is filled between the near-field optical memory head 11 and the recording medium 1 and the near-field optical memory head 11 is formed sufficiently thin by which an interval between the near-field optical memory head 11 and the recording medium 1 can be maintained sufficiently small by utilizing the surface tension of the lubricant. Further, bending of the recording medium 1 can also be followed. Further, the position of the near-field optical memory head 11 can be controlled such that the very small aperture 4 can be arranged at a desired position on the recording medium 1 by a near-field optical memory head control mechanism, not illustrated.

Further, the proximate state of the near-field optical memory head 11 and the recording medium 1 may be controlled by an air bearing similar to a flying head used in hard disk technologies without being dependent on the above-described lubricant, or an AFM control of the type used in a near-field optical microscope may be carried out.

In reproducing information recorded on the recording medium, firstly, by the above-described control, the very small aperture 4 is moved to a desired information reproducing position on the recording medium 1 and the illumination light 9 is illuminated to the light incident face of the core 5 by the light source 8. The illumination light 9 emitted from the light emitting face after having passed through the core 5, irradiates information recording portions of the recording medium 1 which becomes proximate to the very small aperture 4 constituting a reproducing position and at the information recording position, near-field light, that is, near-field light of a reflective type is generated. By the interaction between the near-field light and the very small aperture 4, the propagating light 10 accompanied by characteristics of an intensity, a phase and so on dependent on a recorded state of the information recording portion, is taken out to above the tapered aperture portion 3 via the very small aperture 4. The taken-out propagating light 10 is guided to a light detecting element, not illustrated, and is converted into an electric signal and the recorded state of the information recording portion is determined by a signal processing unit which is not illustrated similarly.

Figure 2:
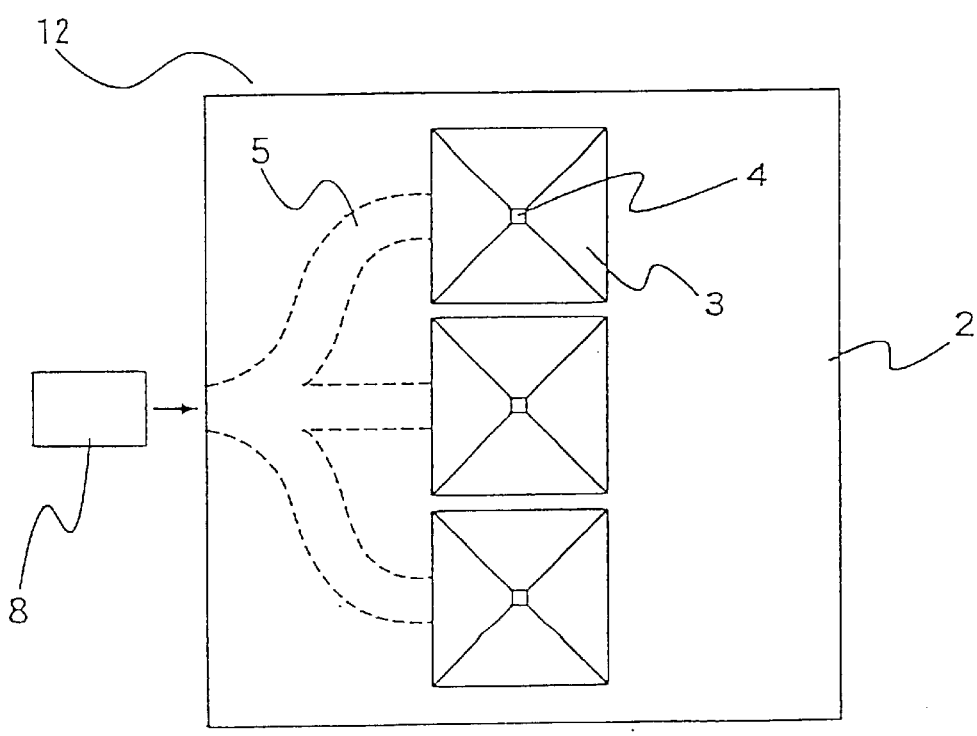
FIG. 2 is a view for explaining array formation of the near-field optical memory heads according to Embodiment 1 of the invention.

Further, the near-field optical memory head 11 can be formed by a conventional semiconductor fabrication process and therefore, a plurality of the near-field optical memory heads 11 can easily be arranged on the same silicon substrate. In that case, a plurality of lasers or the like may be used as light sources or there may be used a plurality of light sources fabricated on a single chip as in a surface emitting laser. As an example, FIG. 2 shows a near-field optical memory head array 12 arranging the near-field optical memory heads 11 in an array. Further, in FIG. 2, the light shielding layer 7 shown by FIG. 1 is omitted such that the structure of the near-field optical memory head array 12 can easily be understood.

In this case, it is not necessary to respectively prepare light sources for each of the respective near-field optical memory heads but, for example, as shown by FIG. 2, the cores 5 (including the clads 6) may respectively be guided from the aperture edge portions of the very small apertures 4 of three of the near-field optical memory heads to a single source 8. Further, although FIG. 2 illustrates a case where illumination light can be supplied to the three near-field optical memory heads in respect of the single light source, the embodiment is not limited thereto but a number of various combinations can be produced.

The near-field optical memory head array 12 is made proximate above the recording medium recorded with information on a plurality of tracks in shapes of concentric circles and the near-field optical memory head array 12 is arranged above the plurality of tracks of the recording medium by which sweep of the head above the recording medium can be minimized and high speed optical recording or reproduction which does not need tracking control can be carried out.

As has been explained, according to Embodiment 1, near the recording medium recorded with information at a high density which can be reproduced by utilizing near-field light, in reproducing the recorded information, there is provided the near-field optical memory head 11 integrated with a near-field light forming system for forming near-field light of a reflective type at the recording medium and a near-field light detecting system for guiding propagating light provided by interactively operating with the formed near-field light to a light detecting element, so that the construction of the optical memory apparatus is made compact and adjustment between respective constituent elements is dispensed with.

Further, the near-field optical memory head according to the invention can be formed by using a semiconductor fabrication process and accordingly, the near-field optical memory head is suitable for mass production and can deal with array formation of the near-field optical memory heads.

Further, according to Embodiment 1, mentioned above, the core 5 and the clad 6 formed at the aperture edge portion of the tapered aperture portion 3 may be formed at a total of the edge portion of the tapered aperture portion 3 or may be formed partially, which can pertinently be selected in view of design.

[Embodiment 2]

Figure 3:
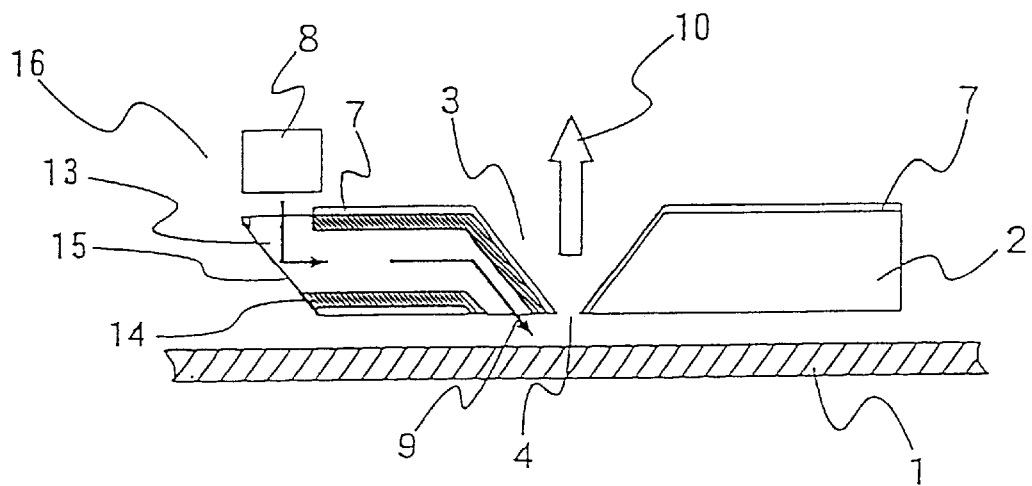
FIG. 3 is a sectional view of a near-field optical memory head according to Embodiment 2 of the invention.

FIG. 3 shows a sectional view of a near-field optical memory head according to Embodiment 2. Further, portions common to those in FIG. 1 are designated by the same notations.

In FIG. 3, according to a near-field optical memory head 16, the light incident face of the core 5 and the clad 6 of the near-field optical memory head 11 according to Embodiment 1, constitutes an upper face of the near-field optical memory head 16 and the illumination light 9 illuminated from the light source 8 arranged above the near-field optical memory head 16 is incident to the light incident face. Further, a reflective layer 15 is formed such that the illumination light 9 incident to the light incident face is guided to the light emitting face of the core 13 and the clad 14 without loss.

The illumination light 9 radiated from the light emitting face after passing through the core 13 forms near-field light of a reflective type at the information recording portion constituting the reproduction position. Similar to the case of Embodiment 1, the propagating light 10 which has been taken out via the very small aperture 4 by the interaction of the near-field light and the very small aperture 4, is guided to a light detecting element, not illustrated, and is converted into an electric signal and is processed similarly at a signal processing unit, not illustrated.

Accordingly, the light source 8 can be arranged above the near-field optical memory head 16 and therefore, in addition to an effect of Embodiment 1, the construction of the optical memory apparatus can be made more compact.

Further, according to Embodiment 2, mentioned above, a core 13 and a clad 14 formed at the aperture edge portion of the tapered aperture portion 3, may be formed at a total of the edge portion of the tapered aperture portion 3 or may be formed partially, which can pertinently be selected in view of design.

Further, the near-field optical memory head 16, explained above, can be formed by using a semiconductor fabrication process and accordingly, the near-field optical memory head 16 is suitable for mass production, can deal with array formation as explained in Embodiment 1 and can be used as a near-field optical memory head array.

Figure 4:
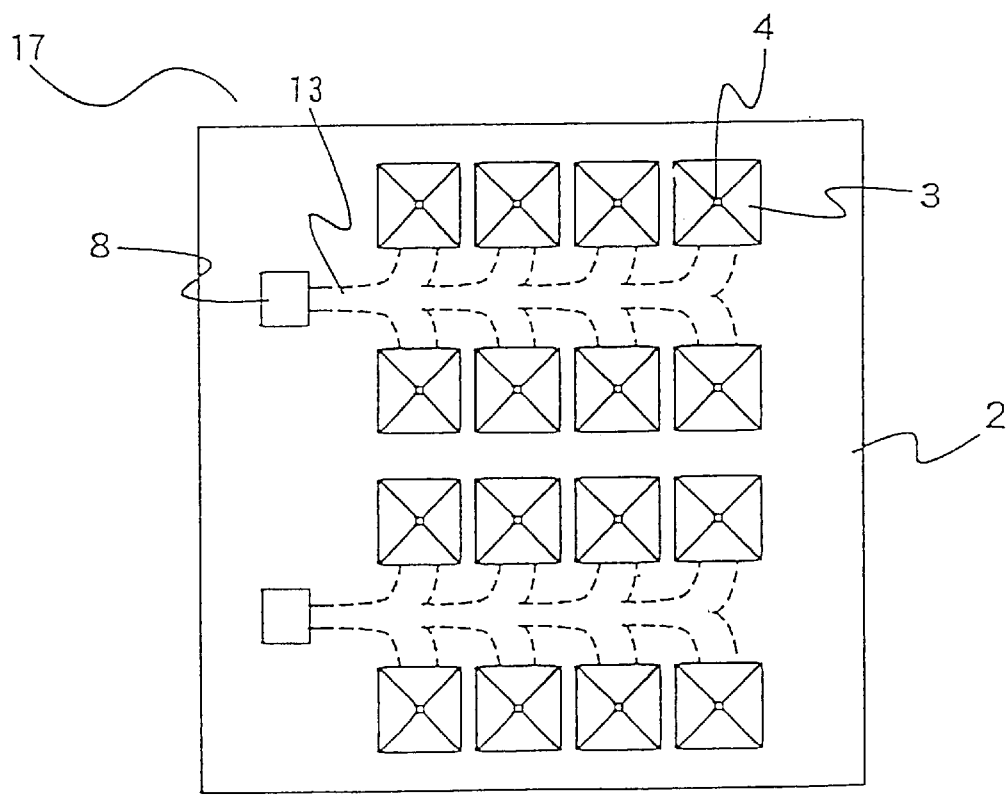
FIG. 4 is a view for explaining array formation of the near-field optical memory heads according to Embodiment 2 of the invention.

For example, there can be provided a constructed which is formed in an array two-dimensionally as shown by FIG. 4. In FIG. 4, the core 13 (including the clad 14) is formed such that the illumination light illuminated from a single one of the light source 8 is respectively guided to aperture edge portions of the very small apertures 4 of eight of the near-field optical memory heads. The illumination light illuminated by the light source 8 is made incident on an inner portion of the silicon substrate 2, that is, the light incident face of the core 13 as shown by FIG. 3. In this case, the reflective layer 15 (not illustrated) is formed in a direction of irradiating light of the light source 8 such that the illumination light is guided to the very small aperture 4 of the respective near-field optical memory head without loss. Although FIG. 4 illustrates that the illumination light can be supplied to of the eight near-field optical memory heads in respect of the single light source, the embodiment is not limited thereto but a number of various combinations are feasible. Further, in the embodiment of FIG. 3, a similar effect is achieved by using a bent optical waveguide path without using the reflective layer 15, constituting the upper face portion of the near-field optical memory head 16 by an end face (light incident face) of the optical waveguide path and arranging the other end face (light emitting face) at the aperture edge portion of the very small aperture 4. The same applies to the embodiment of FIG. 4.

[Embodiment 3]

Figure 5:
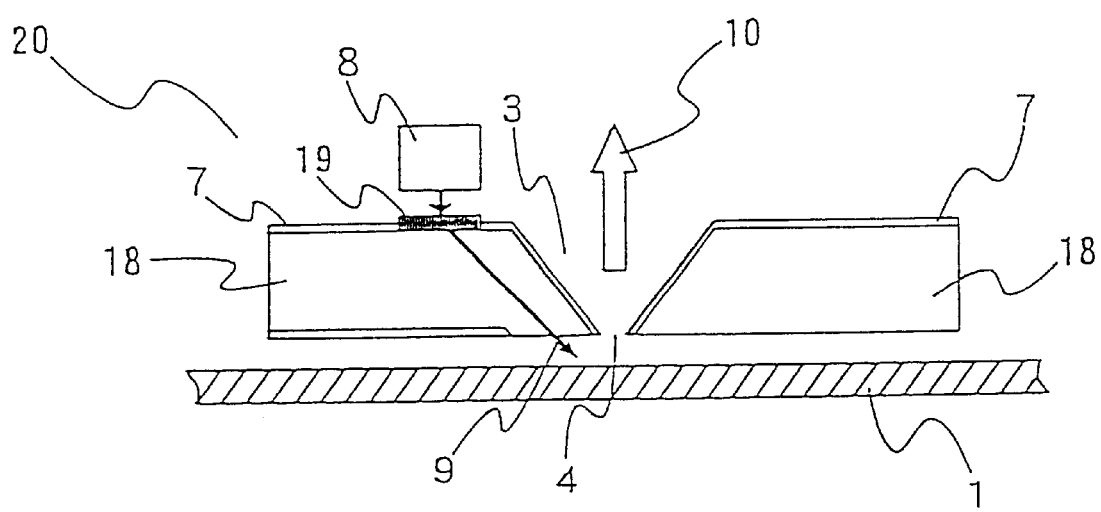
FIG. 5 is a sectional view of a near-f ield optical memory head according to Embodiment 3 of the invention.

FIG. 5 shows a sectional view of a near-field optical memory head according to Embodiment 3. Further, portions common to those in FIG. 1 are designated by the same notations.

A near-field optical memory head 20 of FIG. 5 is formed such that a transparent substrate 18 capable of sufficiently transmitting light is particularly used and the tapered aperture portion 3 penetrating thereof is provided with the very small aperture 4. The very small aperture 4 is provided with a diameter having a size similar to that in Embodiment 1. In this case, diffraction gratings 19 are formed at the aperture edge portion of the tapered aperture portion 3 and an upper face of the transparent substrate 18. The diffraction gratings 19 guide the illumination light 9 incident by the light source 8 arranged above the near-field optical memory head 20 to a vicinity of the very small aperture 4. Further, the light shielding layer 7 is formed on surfaces of the transparent substrate 18 and the tapered aperture portion 3 in order to optically shield the illumination light 9 passing through an inner portion of the transparent substrate 18 except a portion where the illumination light 9 is emitted. The diffraction gratings 19 are formed by micromachining using photolithography, silicon anisotropic etching or the like in, for example, a semiconductor fabrication process.

The illumination light 9 emitted from the light emitting face after passing through the inner portion of the transparent substrate 18 via the diffraction gratings 19, is processed similar to the case of Embodiment 1 and reproduction of information of the recording medium is achieved.

Further, the near-field optical memory head 20, explained above, can be formed by using a semiconductor fabrication process and therefore, the near-field optical memory head 20 is suitable for mass production, can deal with array formation explained in Embodiments 1 and 2 and can be used as a near-field optical memory head array.

Figure 6A:
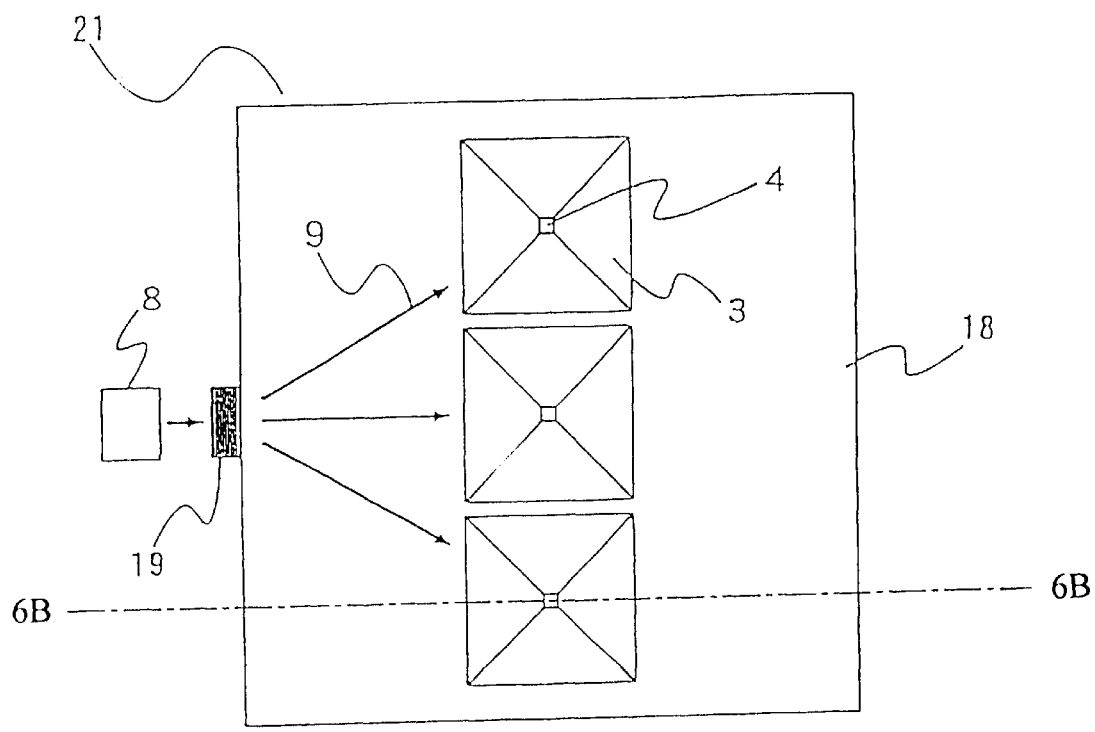
FIGS. 6A and 6B illustrate views for explaining a modified example of the near-field optical memory head according to Embodiment 3 of the invention and array formation thereof.
Figure 6B:
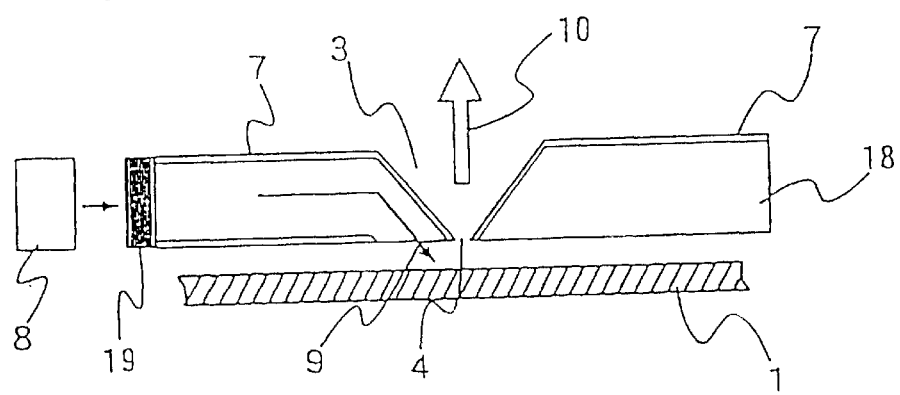

As an example, FIG. 6A shows a near-field optical memory head array 21 in which near-field optical memory heads 19 are arranged in an array. FIG. 6B is a sectional view taken along a line A–A' of FIG. 6A. Further, in FIG. 6A, the light shielding layer 7 shown by FIG. 6B is omitted such that the structure of the near-field optical memory head array 21 can easily be understood.

In this case, as a modified example of the near-field optical memory head 20 explained with reference to FIG. 5, the diffraction gratings 19 are formed at an end face of the transparent substrate 18 in the horizontal direction and the light source 8 is also arranged at a position of irradiating the illumination light 9 to the diffraction gratings 19 similarly in the horizontal direction of the transparent substrate 18. It is not necessary to prepare respective light sources for each of the respective near-field optical memory heads but, for example, as shown by FIG. 6A, the illumination light 9 can respectively be guided to the aperture edge portions of the very small apertures 4 of three of the near-field optical memory heads by a single set of the diffraction gratings 19.

Further, although FIG. 6A illustrates a case where the illumination light can be supplied to the three near-field optical memory heads in respect of the single light source, the embodiment is not limited thereto but a number of various combinations are feasible.

As has been explained, according to Embodiment 3, there is provided the near-field optical memory head 20 integrated with a near-field light forming system for forming near-field light of a reflective type at the recording medium and a near-field light detecting system for guiding the propagating light provided by interactively operating with the formed near-field light to a light detecting element, a complicated fabrication procedure is not needed owing to a particularly simple constitution by the transparent substrate and the diffraction gratings capable of sufficiently transmitting light, the constitution of a total of the optical memory apparatus is made compact and adjustment among respective constituent elements is dispensed with.

[Embodiment 4]

Figure 7:
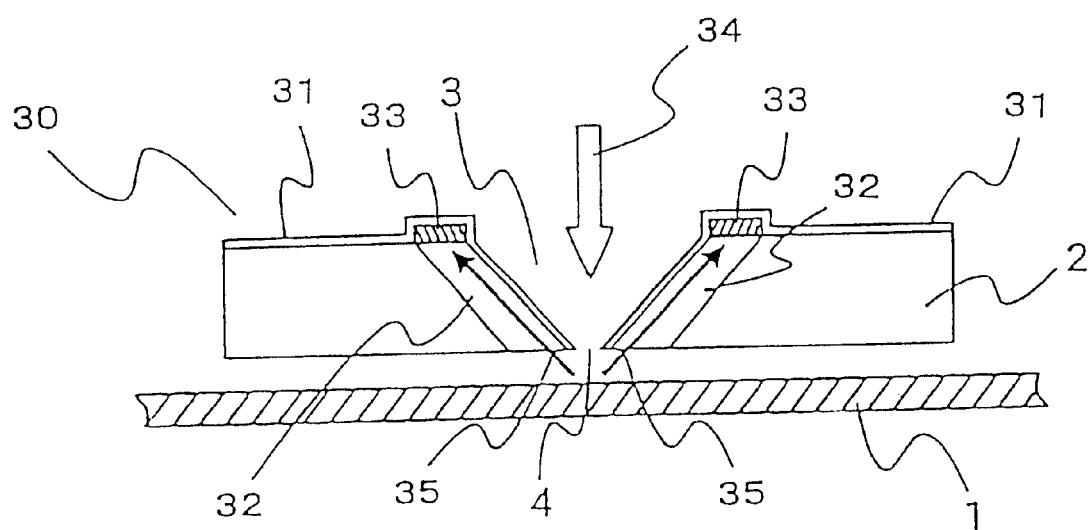
FIG. 7 is a sectional view of a near-field optical memory head according to Embodiment 4 of the invention.

FIG. 7 shows a sectional view of a near-field optical memory head according to Embodiment 4.

A near-field optical memory head 30 of FIG. 7 is formed such that in the silicon substrate 2, the tapered aperture portion 3 penetrating therethrough is provided with the very small aperture 4. The very small aperture 4 is provided with a diameter of, for example, several tens of nanometers such that near-field light is formed by illumination light 34 incident by the tapered aperture portion 3. In this case, as shown by FIG. 7, a light waveguide path 32 is formed from the aperture edge portion of the very small aperture 4 along the taper of the tapered aperture portion 3. Propagating light (scattered light) 35 generated by interaction of near-field light formed at the very small aperture portion 4 and an information recording portion of the recording medium 1, is guided to a light detecting element 33 formed at an upper end portion of the light waveguide path 32, that is, an end portion of the light waveguide path 32 on a side thereof opposed to an end portion thereof on which the propagating light 35 is incident via the light waveguide path 32. In this case, the light waveguide path 32 is constituted by a core and a clad. Further, a light shielding layer 31 is formed on surfaces of the silicon substrate 2, the tapered aperture portion 3 and the light detecting element 33 to optically shield the light waveguide path 32 except the incident portion of the propagating light 35.

The tapered aperture portion 3, the light waveguide path 32 and the light detecting element 33 are formed by micromachining using photolithography, silicon anisotropic etching or the like in, for example, a semiconductor fabrication process. Further, the light shielding layer 31 is a film of a metal of, for example, Au/Cr etc. and is provided by sputtering or vacuum deposition.

Next, an explanation will be given of a method of carrying out recording and reproducing information by near-field light formed at the very small aperture 4 by arranging the near-field optical memory head 30, explained above, above the recording medium 1.

In this case, the recording medium 1 is a planar substrate, for example, in a shape of a circular disk and a near-field optical memory head 30 is arranged at an upper face thereof. In order to operate near-field light formed at the very small aperture 4 of the near-field optical memory head 30 to the recording medium 1, the very small aperture 4 and the recording medium 1 need to be proximate to each other to a degree on the order of a diameter of the very small aperture 4. Hence, a lubricant is filled between the near-field optical memory head 30 and the recording medium 1 and the near-field optical memory head 30 is formed sufficiently thin by which an interval between the near-field optical memory head 30 and the recording medium 1 can be maintained sufficiently small by utilizing the surface tension of the lubricant. Further, even bending of the recording medium 1 can be followed. Further, the position of the near-field optical memory head 30 is controlled such that the very small aperture 4 can be arranged at a desired position on the recording medium 1 by a near-field optical memory head control mechanism, not illustrated.

Further, the proximate state of the near-field optical memory head 30 and the recording medium 1 may be controlled by an air bearing similar to a flying head used in hard disk technologies without being dependent on the above-described lubricant or an AFM control used in a near-field optical microscope may be carried out.

The recording medium 1 comprises, for example, a material capable of applying a phase change recording system and information can be recorded by local illumination of light. Above the recording medium 1, the very small aperture 4 is moved to a desired information recording position by the above-described control. Successively, the illumination light 34 is illuminated to the very small aperture 4 and near-field light is formed at the very small aperture portion 4. By the near-field light, light illumination to a very small region can be carried out to the recording medium 1 and high density information recording is achieved. In this case, the illumination light 34 for forming the near-field light is provided with an intensity sufficiently larger than that of illumination light used in the case of reproducing information, mentioned later.

Further, in recording information, an information recording system for recording information may separately be added without being dependent on the near-field optical memory head according to the invention.

In reproducing information recorded in this way, firstly, by the above-described control, the very small aperture 4 is moved to a desired information reproducing position on the recording medium 1 and the illumination light 34 is illuminated to the very small aperture 4 to thereby form near-field light at the very small aperture portion 4. The propagating light 35 generated by the interaction of the near-field light and the information recording portion of the recording medium 1, is incident on the light waveguide path 32 accompanied by characteristics of an intensity, a phase and so on dependent on a recorded state of the information recording portion. The propagating light 35 incident on the light waveguide path 32 is guided to the light detecting element 33 and converted into an electric signal and the recorded state of the information recording portion is determined by a signal processing unit which is not illustrated similarly via a signal line, not illustrated.

Figure 8A:
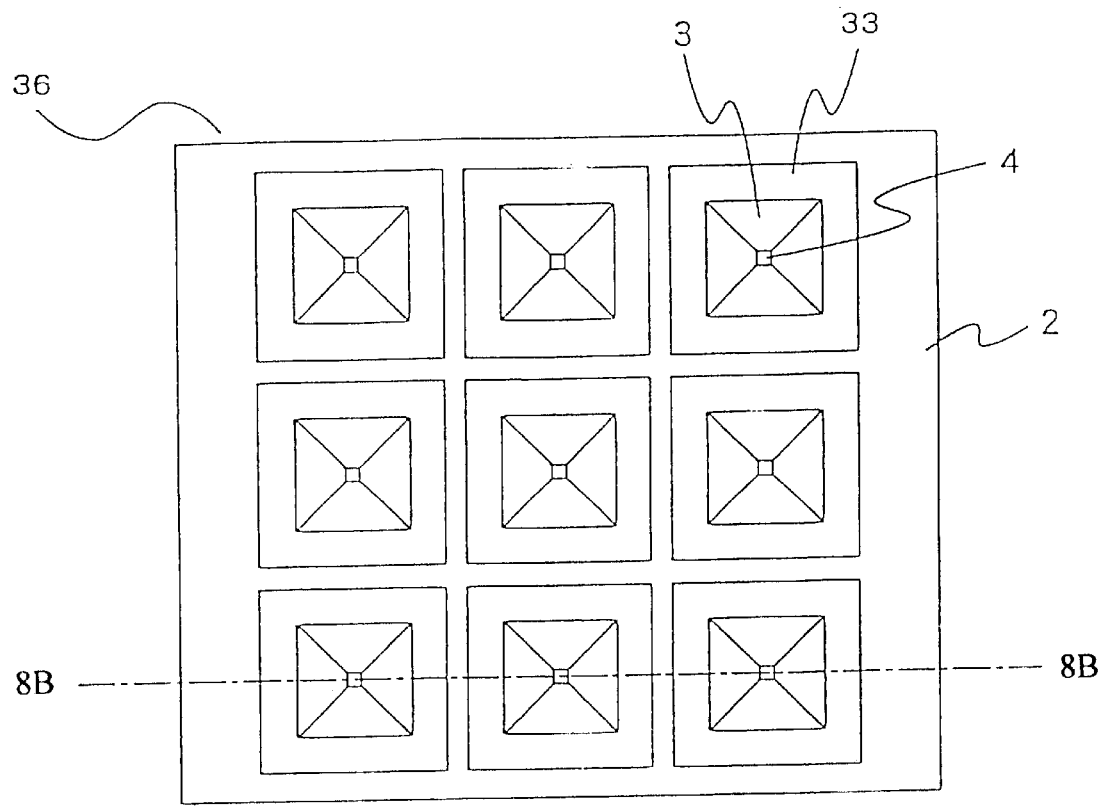
FIGS. 8A and 8B illustrate views for explaining array formation of the near-field optical memory heads according to Embodiment 4 of the invention.
Figure 8B:
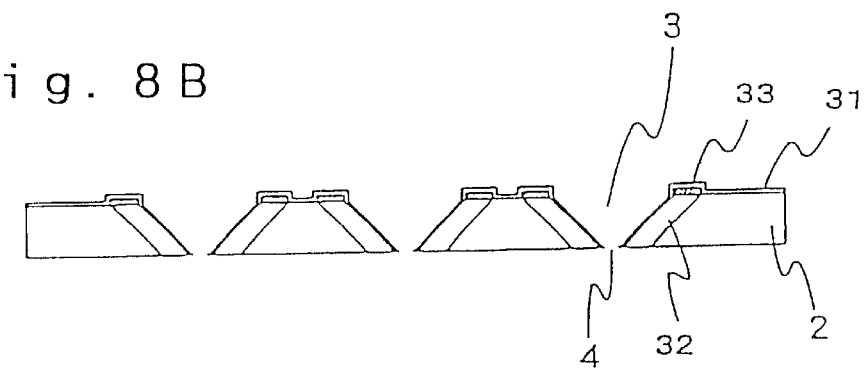

Further, the near-field optical memory head 30 is formed by the conventional semiconductor fabrication process and accordingly, a plurality of the near-field optical memory heads 30 can easily be arranged on the same silicon substrate. As an example, FIG. 8A shows a near-field optical memory head array 36 arranging the near-field optical memory heads 30 in a two-dimensional array. FIG. 8B is a sectional view taken along a line A–A' of FIG. 8A in which the very small apertures 4 of the near-field optical memory head are arranged at intervals in consideration of unit intervals of information recording on the recording medium. Further, in FIG. 8A, the light shielding layer 31 shown by FIG. 8B is omitted such that the structure of the near-field optical memory head array 36 can easily be understood.

The near-field optical memory head array 36 is brought proximate to the recording medium recorded with information on a plurality of tracks in shapes of concentric circles and the near-field optical memory head array 36 is arranged above the plurality of tracks of the recording medium by which sweep of the head on the recording medium can be minimized and high speed optical recording or reproduction which does not need tracking control is made feasible.

As has been explained, according to Embodiment 4, in the case of the recording medium capable of recording information by utilizing near-field light and being recorded with information at a high density, in order to reproduce the recorded information, there is provided the near-field optical memory head 30 integrated with a near-field light forming system for forming near-field light at the recording medium and a near-field light detecting system for scattering the formed near-field light and guiding the scattered light (propagating light) to the light detecting element 33, the constitution of a total of the optical memory apparatus is made compact and adjustment among the respective constituent elements is dispensed with. Further, the light waveguide path 32 for guiding thb scattered light is formed along a direction of showing a high intensity distribution of the scattered light and the light detecting element 33 is provided at a vicinity of the very small aperture 4 as a portion of the head and accordingly, a highly efficient detection of the scattered light with small loss is made feasible.

Further, the near-field optical memory head according to the invention can be formed by using a semiconductor fabrication process and accordingly, the constitution is suitable for mass production and can deal with array formation of the near-field optical memory heads.

Further, in Embodiment 4, mentioned above, the light waveguide path 32 and the light detecting element 33 formed at the aperture edge portion of the tapered aperture portion 3 may be formed at a total of the edge portion of the tapered aperture portion 3 or may be formed partially, which can pertinently be selected in view of design.

[Embodiment 5]

Figure 9:
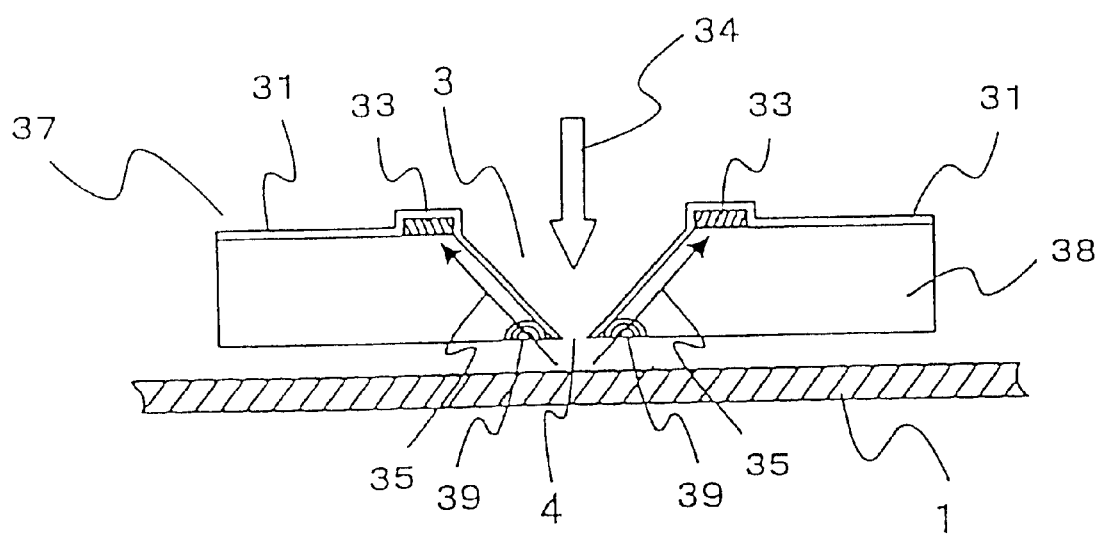
FIG. 9 is a sectional view of a near-field optical memory head according to Embodiment 5 of the invention.

FIG. 9 shows a sectional view of a near-field optical memory head according to Embodiment 5. Further, portions common to those of FIG. 7 are attached with the same notations.

In FIG. 9, a near-field optical memory head 37 uses a transparent substrate 38 particularly capable of sufficiently transmitting light in place of the silicon substrate 2 of the near-field optical memory head 30 according to Embodiment 4 and formed with a microlens 39 in place of the light waveguide path 32. The microlens 39 is, for example, a refractive index grading lens in which the refractive index is continuously changed and is formed by carrying out a selective ion exchange method at the aperture edge portion of the very small aperture 4.

Operation of the device for recording information is similar to that in Embodiment 4 and accordingly, an explanation thereof will be omitted.

Next, an explanation will be given of a method of reproducing information recorded on the recording medium. Near-field light formed at the very small aperture portion 4 by the illumination light 34 is converted into the propagating light 35 by the interaction with an information recording portion of the recording medium 1 and the scattered propagating light 35 is condensed to the light detecting element 33 by the microlens 39 provided at the aperture edge portion of the very small aperture 4. The propagating light 35 received by the light detecting element 33 is converted into an electric signal similar to the case of Embodiment 4 and is processed by a signal processing unit, not illustrated.

Therefore, by focusing light by the microlens 39, the propagating light 35 having an intensity sufficient for being able to determine a recorded state of the information recording portion can be guided to the light detecting element 33 and in addition to an effect of Embodiment 4, information reproduction with higher reliability is realized. Further, an output of the illumination light 34 can be reduced and heating of the near-field optical memory head by the illumination light 34 as well as power consumption is restrained.

Figure 10A:
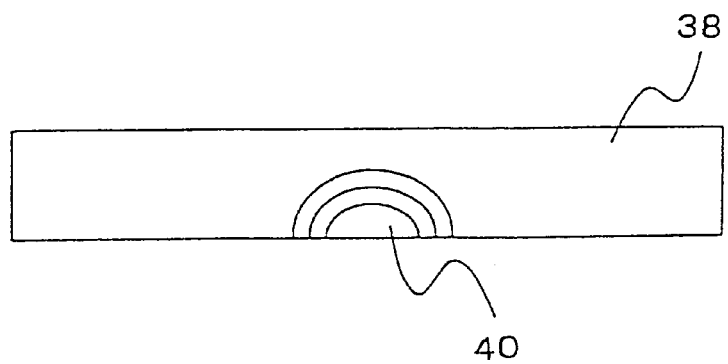
FIGS. 10A and 10B illustrate views showing a modified example of the near-field optical memory head according to Embodiment 5 of the invention.
Figure 10B:
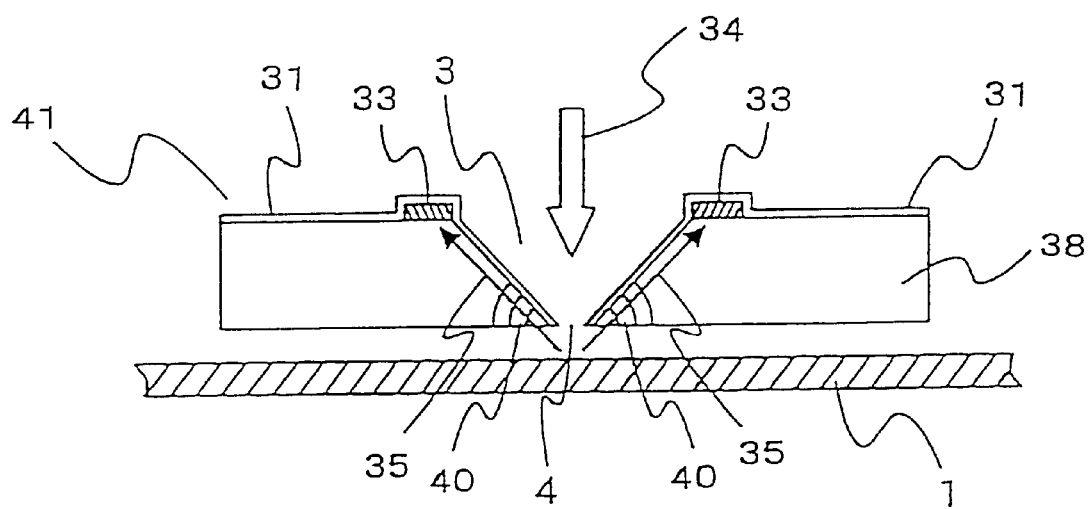

Further, as a modified example of the near-field optical memory head 37 explained in reference to FIG. 9, it is possible that as shown by FIG. 10A, a microlens 40, for example, a refractive index grading lens, mentioned above, is previously formed in the transparent substrate 38 capable of sufficiently transmitting light, successively, as in a near-field optical memory head 41 shown by FIG. 10B, the tapered aperture portion 3 is formed such that the center of the very small aperture 4 is disposed on an optical axis of the formed microlens 40 and the light detecting element 33 and the light shielding layer 31 are provided.

Further, the above-described microlens is not limited to the refractive index grading lens but may be other member having a lens effect such as diffraction gratings or the like.

Further, according to Embodiment 5, mentioned above, the microlens and the light detecting element 33 formed at the aperture edge portion of the tapered aperture portion 3 may be formed at a total of the edge portion of the tapered aperture portion 3 or may be formed partially, which can pertinently be selected in view of design.

[Embodiment 6]

Figure 11:
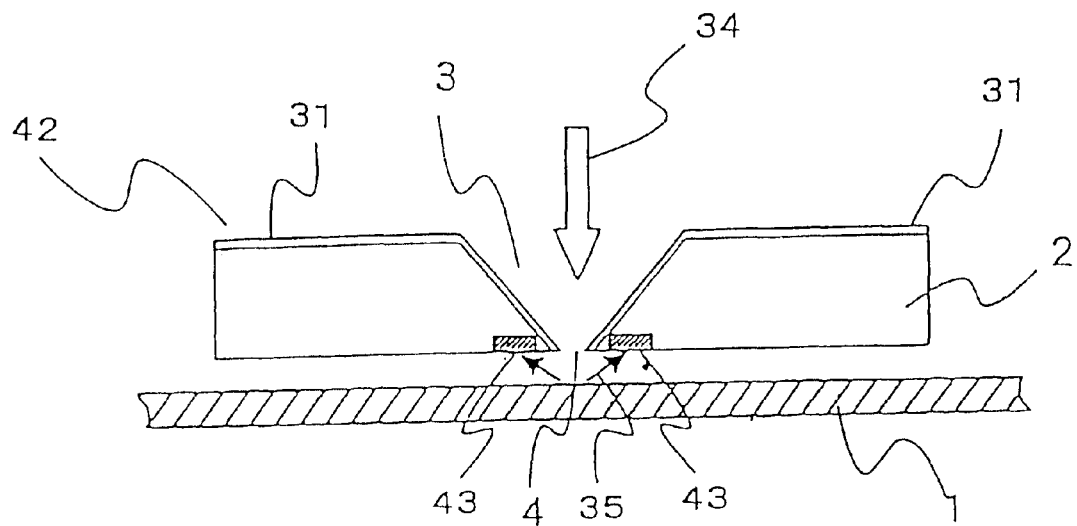
FIG. 11 is a sectional view of a near-field optical memory head according to Embodiment 6 of the invention.

FIG. 11 shows a sectional view of a near-field optical memory head according to Embodiment 6. Further, portions common to those of FIG. 7 are attached with the same notations.

A near-field optical memory head 42 of FIG. 11 is formed such that in the silicon substrate 2, the tapered aperture portion 3 penetrating therethrough is provided with the minute or very small aperture 4 as in the other embodiments. The very small aperture 4 is provided with a diameter of, for example, several tens of nanometers such that near-field light is formed by the illumination light 34 incident from the tapered aperture portion 3. In this case, as shown by FIG. 11, a light detecting element 43 is formed at the aperture edge portion of the very small aperture 4. The propagating light (scattered light) generated by interaction of near-field light formed at the very small aperture portion 4 and an information recording portion of the recording medium 1, is received by the light detecting element 43 at an aperture edge portion of the very small aperture 4. Further, the light shielding layer 31 for optically shielding the light detecting element 43 except an incident portion of the propagating light 35 is formed on surfaces of the silicon substrate 2 and the tapered aperture portion 3.

Similar to Embodiment 4, the tapered aperture portion 3 and the light detecting element 43 are formed by micromachining using photolithography, silicon anisotropic etching or the like in, for example, a semiconductor fabrication process and the light shielding layer 31 is provided as a film of a metal of, for example, Au/Cr etc. by sputtering or vacuum deposition. Further, when the silicon substrate 2 is provided with light shielding performance sufficiently for the wavelength of illumination light 34 illuminated to the very small aperture 4, the light shielding layer 31 can be omitted.

Operation of recording information is equivalent to that in Embodiment 4 and accordingly, an explanation thereof will be omitted.

Next, an explanation will be given of a method of reproducing information recorded on the recording medium. Near-field light formed at the very small aperture portion 4 by the illumination light 34, is converted into the propagating light 35 by interaction with the information recording portion of the recording medium 1 and the scattered propagating light 35 is incident on the light detecting element 43 provided at the aperture edge portion of the very small aperture 4. Similar to the case of Embodiment 4, the propagating light 35 received by the light detecting element 43 is converted into an electric signal and is processed by a signal processing unit, not illustrated.

Therefore, the propagating light 35 having a characteristic capable of determining a recorded state of the information recording portion can be received directly by the light detecting element 43 and in addition to effects of Embodiments 4 and 5, stable information reproduction of the propagating light 35 with no loss is realized.

Figure 12:
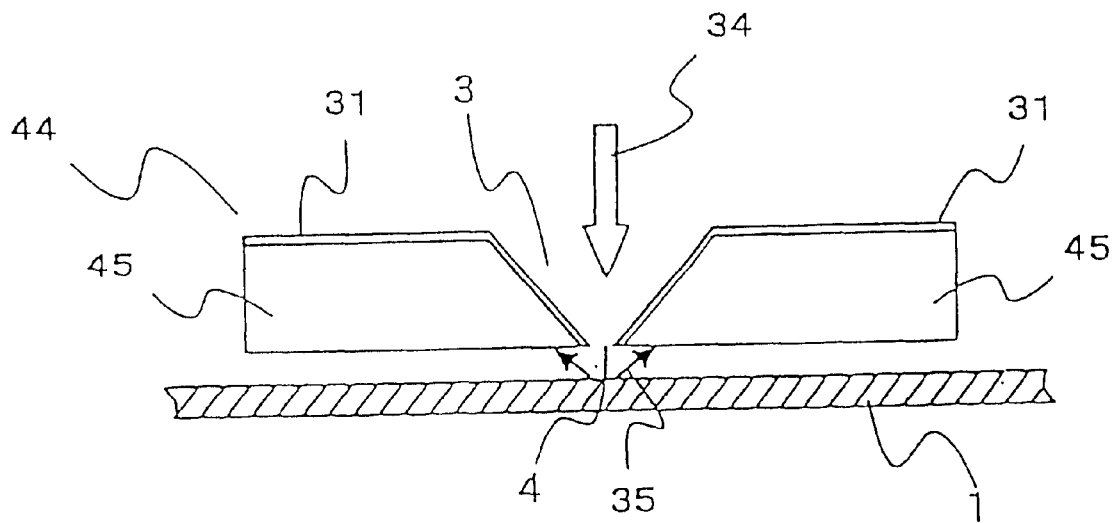
FIG. 12 is a view showing a modified example of the near-field optical memory head according to Embodiment 6 of the invention.

Further, as a modified example of the near-field optical memory head 42 explained with reference to FIG. 11, as in a near-field optical memory head 44 shown by FIG. 12, the propagating light 35 may directly be received by using a light detecting element substrate 45 in which a light detecting element is constituted by the substrate per se formed with the tapered aperture portion 3 and the very small aperture 4.

Further, according to Embodiment 6, mentioned above, the light detecting element 43 formed at the aperture edge portion of the tapered aperture portion 3 may be formed at a total of the edge portion of the tapered aperture portion 3 or may be formed partially, which can pertinently be selected in view of design.

Both of the near-field optical memory heads according to Embodiments 5 and 6, explained above, can be formed by using a semiconductor fabrication process and accordingly, the constitution is suitable for mass production, can deal with array formation explained in Embodiment 4 and can be used as a near-field optical memory head array.

[Embodiment 7]

Figure 13:
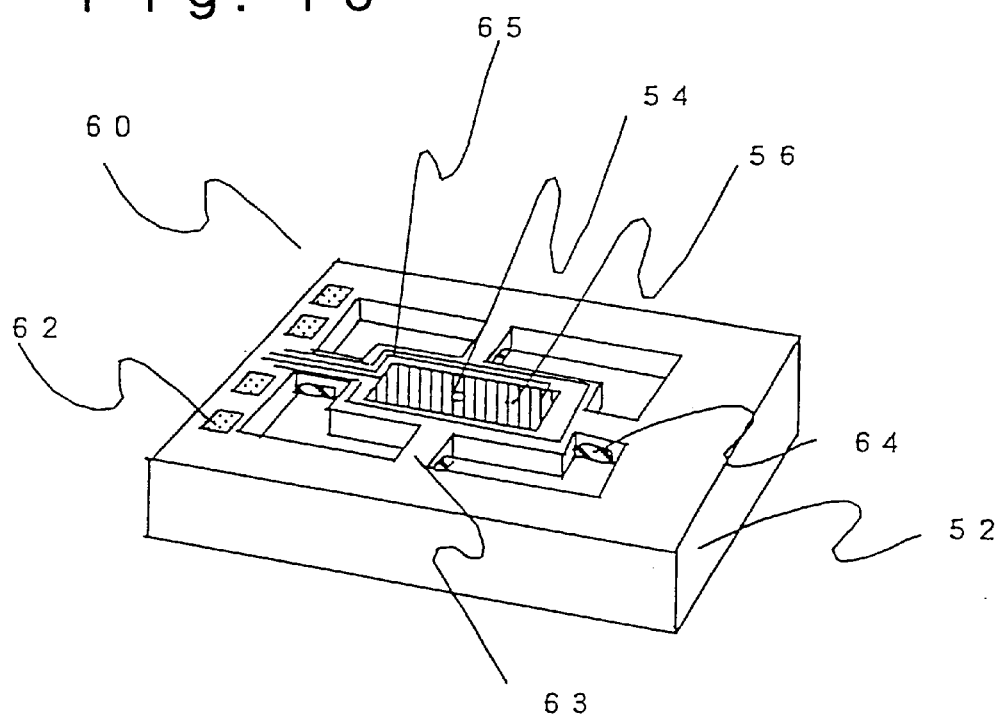
FIG. 13 is a perspective view of a near-field optical memory head according to Embodiment 7 of the invention.

FIG. 13 shows a perspective view of a near-field optical memory head 60 according to Embodiment 7.

Near-field light forming means having a very small aperture portion for forming near-field light at a recording medium and near-field light detecting means for detecting formed near-field light, are provided at the same substrate and the substrate is referred to as a near-field light substrate. The constitution is provided with a function unit having a very small aperture portion 54 for detecting light and the function unit is supported by an outer peripheral portion substrate by beams. The near-field optical memory head 60 is a substrate constituted by silicon and is fabricated by using photolithography technology as a fabrication method.

The function unit is constituted by the very small aperture 54 and a light detecting portion of a PIN photo-diode for detecting near-field light.

A silicon substrate 52 constituting the function unit is formed such that a tapered aperture portion penetrating therethrough is provided with the very small aperture 54. The very small aperture 54 is provided with a diameter of, for example, several tens of nanometers such that near-field light is formed by illumination light incident from the tapered aperture portion. Propagating light (scattered light) generated by interaction of near-field light formed at the very small aperture portion 54 and the information recording portion of the recording medium 1, is detected by a light detecting element 56 fabricated proximately thereto.

The tapered aperture portion and the light detecting element 56 are formed by micromachining using photolithography, silicon anisotropic etching or the like in, for example, a semiconductor fabrication process. Further, a light shielding layer 55 is a film of a metal of, for example, Au/Cr etc. and is provided by sputtering or vacuum deposition.

Figure 16:
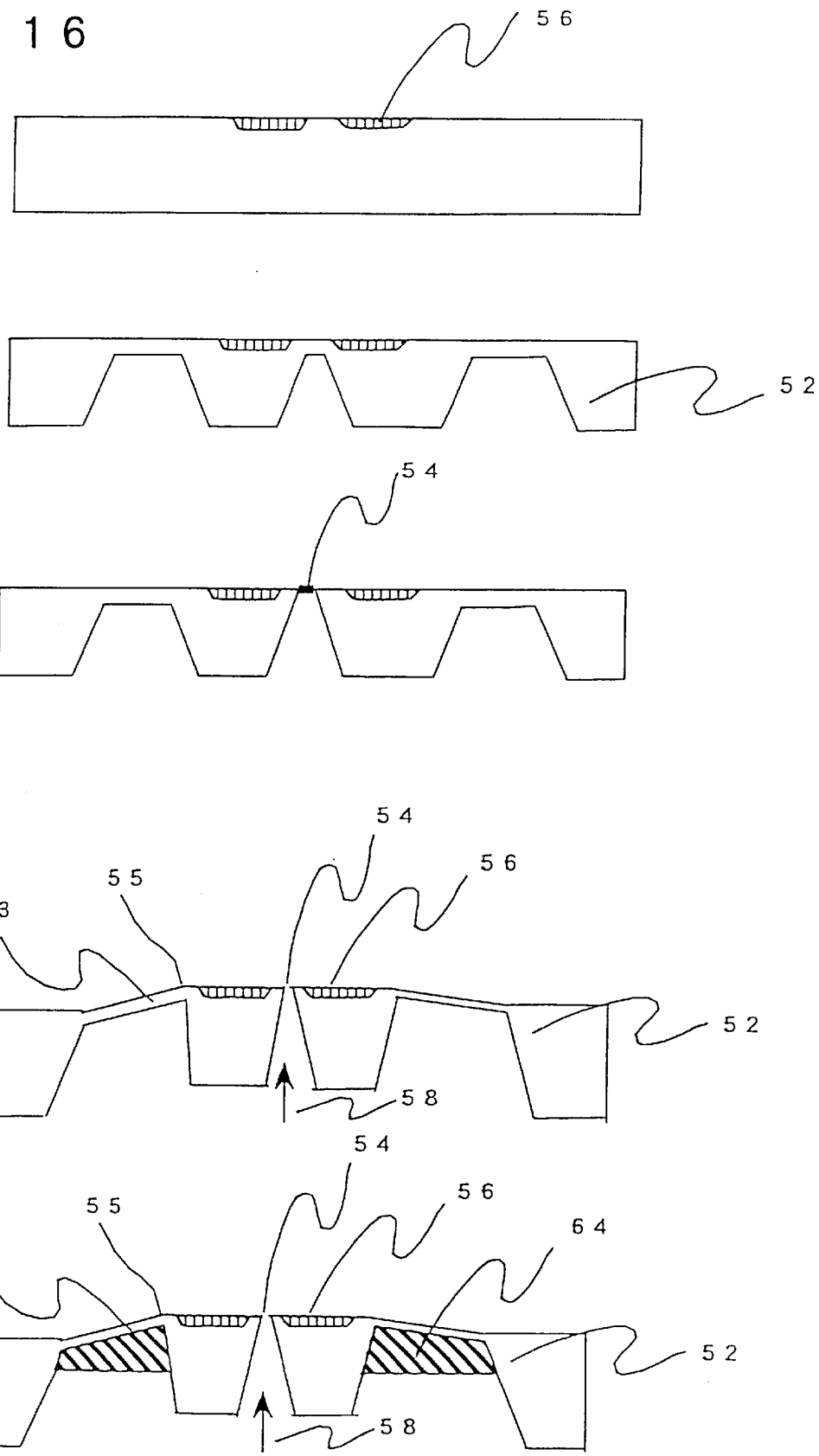
FIG. 16 illustrates step diagrams of the near-field optical memory head according to Embodiment 7 of the invention.
Figure 17:
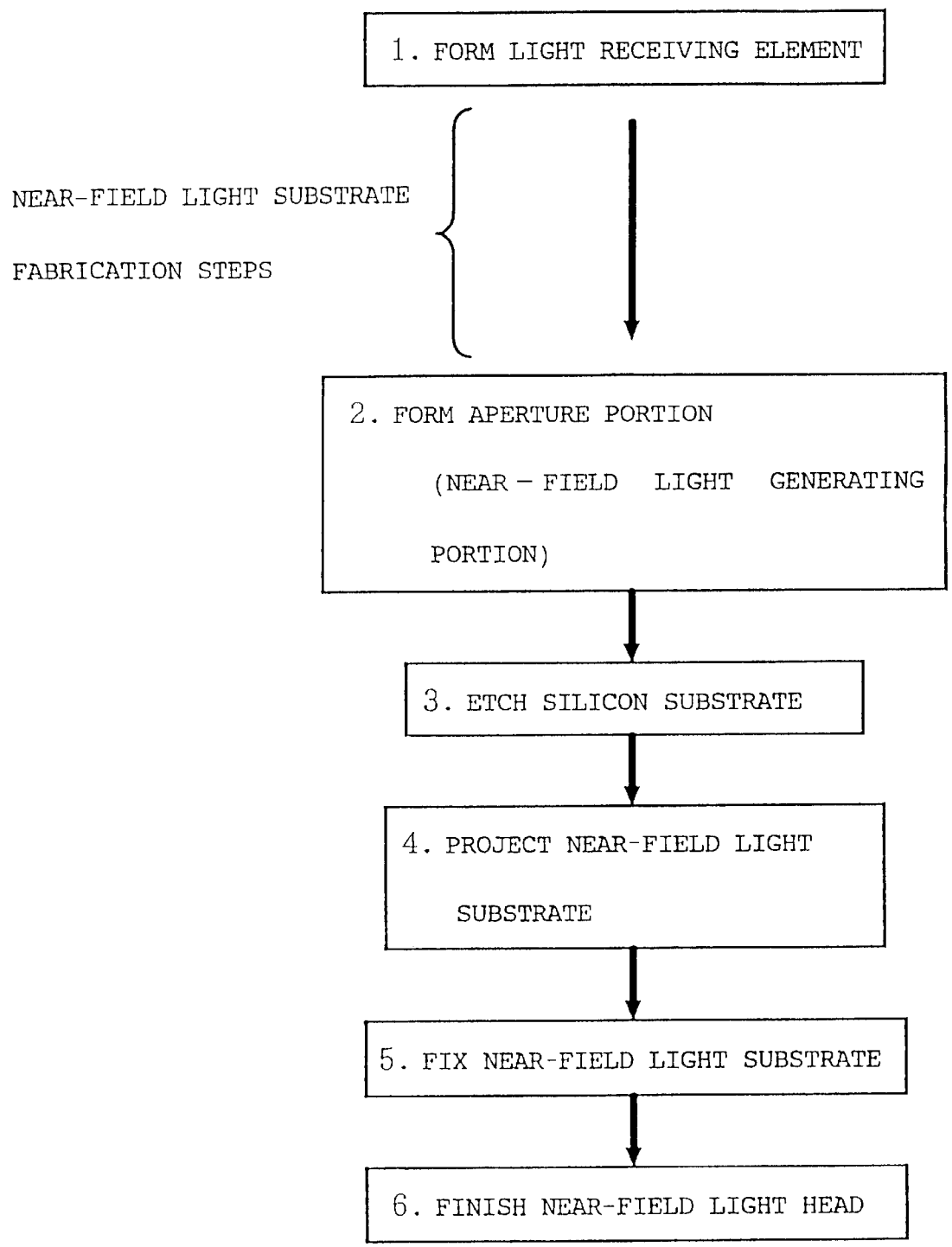
FIG. 17 is a diagram showing fabrication steps according to Embodiment 7 of the invention.

An explanation will be given of a fabrication process in reference to FIG. 17 and FIG. 16. In order to fabricate a near-field light substrate, at a first step, a PIN photo-diode for detecting near-field light is formed by a photolithography step. The PIN photo-diode is for detecting near-field light. In arranging the PIN photo-diode which is the light detecting element 56, according to the embodiment, the PIN photo-diode is arranged in the form of overlapping a surrounding of the very small aperture portion 54. Further, in the photolithography step, a plane is provided by taking a consideration such that recesses and protrusions are not formed. According to the embodiment, recesses and protrusions are not formed by using diffused wiring as a wiring material. Next, at a second step, the very small aperture 54 of the near-field optical memory head 60 for forming near-field light is formed by anisotropic etching. Although according to the embodiment, anisotropic etching of silicon is used, the aperture portion may be formed by using high density plasma etching or the very small aperture 54 may be formed by a combination of anisotropic etching and focused ion beam. At a third step, the silicon substrate is etched for forming a thin wall portion for displacing the silicon. Naturally, this operation may be carried out by a step the same as the second step. In projecting the near-field light substrate at a fourth step and fixing the near-field light substrate at a fifth step, in order to project the substrate having the light detecting element 56 and the very small aperture 54 from the peripheral substrate, the substrate is projected by external force and thereafter solidly fixed to maintain displacement by resin or the like. In the solidifying operation, the operational performance can be promoted by using ultraviolet ray hardened resin or the like. At a fifth step, the constitution is finished as the optical memory head.

After finishing the optical memory head, an output terminal thereof is connected to a very thin wiring substrate by which a very small signal can be detected to thereby constitute the near-field optical memory head 60. FIG. 16 illustrates diagrams showing the steps by using sectional views. An explanation will be given by using the step diagrams of FIG. 16. First, the light detecting portion 56 is formed at a silicon portion of a semiconductor substrate by a normal semiconductor process. According to the embodiment, a PIN structure is formed. Next, etching is carried out from a rear face by a silicon etching process to thereby form the beam portions 63 and the aperture portion 54. At a successive step, a through hole is formed at the aperture portion. A step for projecting the near-field light substrate is successively carried out and according to the embodiment, the displacement is carried out by external force and the displacement is solidly fixed by using ultraviolet ray hardened resin. By these steps, near-field light head is finished.

Figure 14:
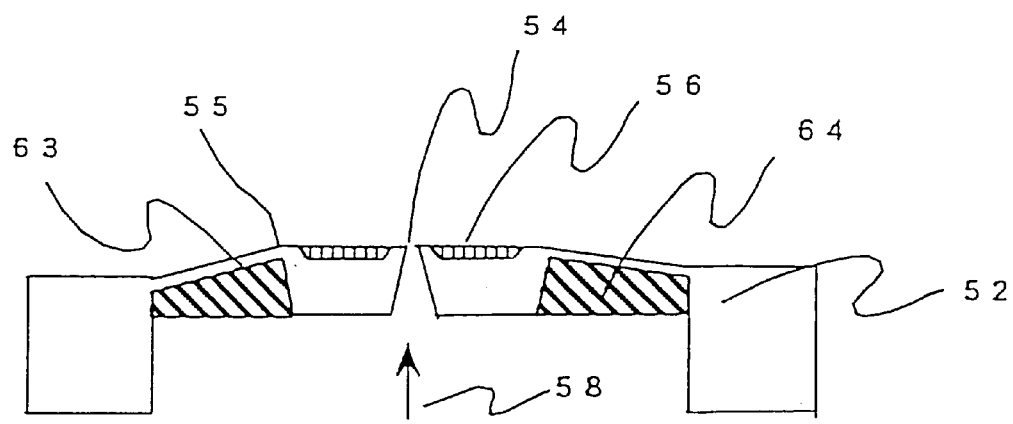
FIG. 14 is a sectional view of the near-field optical memory head according to Embodiment 7 of the invention.

According to Embodiment 7, as shown by FIG. 13, there is constructed a constitution in which the near-field light substrate is supported by four beams. Naturally, the constitution may be formed by two beams. In forming the four beams, the beams are formed by using silicon micromachining. FIG. 14 is a sectional view of the near-field optical memory head 60. It is known that the near-field light substrate is constituted to be supported by the supporting substrate via the beams. Further, it is known that the near-field light substrate is projected from the supporting substrate. According to the embodiment, there is constructed a constitution in which the near-field light substrate is projected from the supporting substrate by 0.1 mm and wiring can be taken out from the output terminal.

Figure 15:
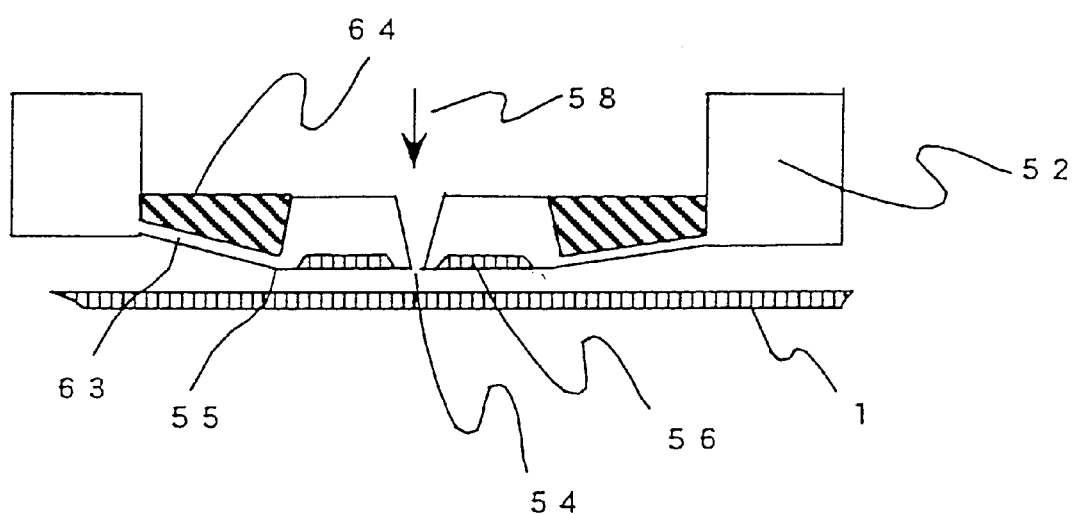
FIG. 15 is a perspective view of the near-field optical memory head according to Embodiment 7 of the invention.

Next, an explanation will be given of a method of recording and reproducing information by near-field light formed at the very small aperture 54 by arranging the near-field optical memory head 60, explained above, on the recording medium 1. FIG. 15 shows the near-field optical memory head 60 and the recording medium 1.

In this case, the recording medium 1 is a planar substrate in, for example, a shape of a circular disk and the near-field optical memory head 60 is arranged at an upper face thereof. The very small aperture 54 and the recording medium 1 need to be proximate to each other to a degree of a diameter of the very small aperture 54 in order to operate near-field light formed at the very small aperture 54 of the near-field optical memory head 60 to the recording medium 1. Hence, a lubricant is filled between the near-field optical memory head 60 and the recording medium 1 and the near-field optical memory head 60 is formed sufficiently thin by which an interval between the near-field optical memory head 60 and the recording medium 1 can be maintained sufficiently small by utilizing the surface tension of the lubricant. Further, bending of the recording medium 1 can also be followed. Further, the position of the near-field optical memory head 60 is controlled such that the very small aperture 54 can be arranged at a desired position above the recording medium 1 by a control mechanism of the near-field optical memory head 60, not illustrated. Further, the proximate state of the near-field optical memory head 60 and the recording medium 1 may be controlled by an air bearing similar to a flying head used in hard disk technologies without being dependent on the above-described lubricant or an AFM control used in a near-field optical microscope may be carried out.

The recording medium 1 comprises a material to which, for example, a phase change recording system is applicable and enables information recording by local illumination of light. Above the recording medium 1, the very small aperture 54 is moved to a desired information recording position by the above-described control. Successively, illumination light is illuminated to the very small aperture 54 to thereby form near-field light at the very small aperture portion 54. By the near-field light, light illumination to a very small region can be carried out to the recording medium 1 and high density information recording is achieved. In this case, illumination light for forming the near-field light is provided with an intensity sufficiently larger than that of illumination light used in the case of information reproduction, mentioned later.

Further, the information recording may be carried out by separately adding an information recording system for carrying out information recording without being dependent on the near-field optical memory head 60 according to the invention.

In reproducing information recorded in this way, firstly, by the above-described control, the very small aperture 54 is moved to a desired information reproducing position above the recording medium 1, illumination light is illuminated to the very small aperture portion 54 and near-field light is formed at the very small aperture portion 54. Propagating light generated by interaction of the near-field light and the information recording portion of the recording medium 1, is incident thereon by being accompanied with characteristics of an intensity, a phase and so on dependent on a recorded state of the information recording portion. The incident propagating light is guided to the light detecting portion 56 and is converted into an electric signal and the recorded state of the information recording portion is determined by a signal processing unit which is not similarly illustrated via a signal line, not illustrated.

Further, the near-field optical memory head 60 can be formed by the conventional semiconductor fabrication process and accordingly, a plurality of the near-field optical memory heads 60 can easily be arranged on the same silicon substrate.

The near-field optical memory head array is made proximate the recording medium 1 recorded with information on a plurality of tracks in shapes of concentric circles and the near-field optical memory head array is arranged above the plurality of tracks of the recording medium 1 by which sweep of the head above the recording medium 1 can be minimized and high speed optical recording or reproduction which does not need a tracking control is made feasible.

As has been explained, according to Embodiment 7, in the recording medium 1 capable of reproducing information by utilizing the near-field light and recorded with information at a high density, in order to reproduce the recorded information, there is provided the near-field optical memory head 60 integrated with a near-field light forming system for forming the near-field light at the recording medium 1 and a near-field light detecting system for scattering the formed near-field light and guiding the scattered light (propagating light) to the light detecting element 56, the constitution of a total of the optical memory apparatus is made compact and adjustment among the respective constituent elements is dispensed with.

Further, the near-field optical memory head 60 according to the invention can be formed by using a semiconductor fabrication process and accordingly, the constitution is suitable for mass production and can deal with array formation of the near-field optical memory head 60.

[Embodiment 8]

According to Embodiment 8, a near-field light substrate, not illustrated, is fabricated by a constitution in which the near-field light substrate is supported by a supporting substrate via thin wall portions. There is constructed a constitution in which an intermediary between the near-field light substrate and the supporting substrate is thin-walled. The constitution is formed by using silicon micromachining. The structure is formed by a method of forming a thin wall portion without forming a beam portion and projecting only the near-field light substrate portion. According to the embodiment, the embodiment is constituted to project by 0.1 mm and wiring can be taken out from an output terminal. Further, in order to continuously maintain the protrusion, the protrusion is fixed by using and solidifying resin.

Industrial Applicability

As has been explained, according to one aspect of the invention the near-field light forming system for forming the near-field light of a reflective type on a recording medium and the near-field light detecting system for guiding the propagating light provided by interaction with the formed near-field light to the light detecting element are integrated and accordingly, the constitution of the optical memory apparatus is made compact and adjustment among respective constituent elements is dispensed with.

As has been explained, according to another aspect of the invention the near-field light forming system for forming the near-field light of a reflective type on a recording medium and the near-field light detecting system for guiding the propagating light provided by interaction with the formed near-field light to the light detecting element are integrated and accordingly, the constitution of the optical memory apparatus is made compact and adjustment among respective constituent elements is dispensed with. Further, array formation can easily be realized. Further, the light source can be arranged at a side of the near-field optical memory head and accordingly, an upper portion of the near-field optical memory head can effectively be utilized.

As has been explained, according another aspect of to the invention in addition to realizing compact formation of the constitution of the optical memory apparatus, dispensing with adjustment among respective constituent elements and array formation of the head, the light source can be arranged at an upper portion of the near-field optical memory head and accordingly, the side portion of the near-field optical memory head can effectively be utilized.

As has been explained, according to the invention of another aspect of in addition to realizing compact formation of the optical memory apparatus, dispensing with adjustment among respective constituent elements and array formation of the head and effective utilization of the side portion of the near-field optical memory head, the near-field optical memory head can be formed without need of a complicated fabrication procedure.

As has been explained, according to another aspect of the invention in addition to compact formation of the optical memory apparatus, dispensing with adjustment among respective constituent elements and effective utilization of the upper portion of the near-field optical memory head, the near-field optical memory head can be formed without the need for a complicated fabrication procedure, particularly, array formation of the head can easily be realized.

As has been explained, according to another aspect of the invention in the planar substrate formed by penetrating at least one hole in a shape of an inverted pyramid such that a top portion thereof constitutes the very small aperture, the light waveguide path is formed along the side face of the hole in the depth direction such that the one end portion is disposed at the aperture edge portion of the very small aperture and the light detecting means is formed at the other end portion of the light waveguide path and accordingly, there can be provided the near-field optical memory head integrated with the near-field light forming system for forming the near-field light at the recording medium and the near-field light detecting system for scattering the formed near-field light and guiding the scattered light (propagating light) to the light detecting element, the optical memory apparatus is made compact, adjustment among respective constituent elements is dispensed with, and further, an array formation can easily be realized.

Further, the light waveguide path for guiding the scattered light is formed along a direction showing a high intensity distribution of the scattered light, the light detecting element is provided at a vicinity of the very small aperture as a portion of the head and accordingly, highly efficient detection of the scattered light with small loss is made feasible.

As has been explained, according to another aspect of the invention in the planar substrate formed by penetrating at least one hole in a shape of an inverted pyramid such that a top portion thereof constitutes the very small aperture and comprising a material of transmitting light, the lens is formed at the aperture edge portion of the very small aperture, the light detecting means is formed on the optical axis of the lens and on the planar substrate and accordingly, there can be provided the near-field optical memory head integrated with the near-field light forming system for forming the near-field light at the recording medium and the near-field light detecting system for scattering the formed near-field light and guiding the scattered light (propagating light) to the light detecting element, the optical memory apparatus is made compact, adjustment among constituent elements is dispensed with, further, the array formation can easily be realized.

Further, by focusing light by the lens, the propagating light having an intensity sufficient to enable determination of the recorded state of the information 4 recording portion of the recording medium can be guided to the light detecting element and information reproduction having higher reliability is realized. Further, an output of the illumination light for forming the near-field light can be reduced and heating of the near-field optical memory head by the illumination light along with power consumption is restrained.

As has been explained, according to another aspect of the invention in the planar substrate formed by penetrating at least one hole in a shape of an inverted pyramid such that a top portion thereof constitutes the very small aperture, the light detecting means is provided at the aperture edge portion of the very small aperture and therefore, there can be provided the near-field optical memory head integrated with the near-field light forming system for forming the near-field light at the recording medium and the near-field light detecting system for scattering the formed near-field light and guiding the scattered light (propagating light) to the light detecting element, the optical memory apparatus is made compact, adjustment among constituent elements is dispensed with, further, the array formation can easily be realized.

Further, the propagating light having a characteristic capable of determining the recorded state of the information recording portion of the recording medium can directly be received by the light detecting element and stable information reproduction with no loss of the propagating light can be realized.

As has been explained, according to another aspect of the invention by the constitution in which the near-field light forming means having the very small aperture portion 54 for forming the near-field light at the recording medium 1 and the near-field light detecting means for detecting the formed near-field light are provided on the same substrate and the substrate (near-field light substrate) is projected from a supporting substrate at the outer peripheral portion thereof, the propagating light generated by interaction of the near-field light formed by irradiating light to the very small aperture 54 and the recording medium 1 is received by the light detecting means whereby these elements can be realized on the same substrate, and further, the near-field optical memory head can easily approach the recording medium 1 and an output signal can easily be taken out from an output terminal.

Further, the propagating light having a characteristic capable of determining the recorded state of the information recording portion of the recording medium 1 can directly be received by the light detecting element 56 and stable information reproduction with no loss of propagating light is realized.

As has been explained, according to the invention there can be provided the near-field optical memory head integrated with the near-field light forming system and the near-field light detecting system, so that the optical memory apparatus is made compact and array formation can easily be realized.

What is claimed is:

1. A near-field optical memory head for at least one of recording and reproducing information on a recording medium utilizing near-field light, comprising:

a planar substrate having at least one hole in the shape of an inverted cone or pyramid penetrating therethrough such that one end of each hole constitutes a minute aperture for passing light therethrough and the substrate is flat in the vicinity surrounding each aperture so that the aperture does not project from the substrate;

near-field light producing means provided on the planar substrate for producing near-field light at the recording medium; and near-field light detecting means provided on the planar substrate for detecting the near-field light.

2. A near-field optical memory head according to claim 1; further comprising a light waveguide having a core and a clad formed in the planar substrate adjacent each hole for directing light from one end of the waveguide adjacent an edge of the at least one minute aperture to an opposite end of the waveguide.

3. A near-field optical memory head according to claim 1; wherein the substrate comprises one of a silicon substrate and a transparent substrate, each minute aperture has a diameter of tens of nanometers, and the near-field light producing means comprises a surface-emitting laser.

4. The near-field optical memory head for at least one of recording and reproducing information on a recording medium utilizing near-field light, comprising:

a planar substrate having at least one hole in the shape of an inverted cone or pyramid penetrating therethrough such that one end of each hole constitutes a minute aperture for passing light therethrough and the substrate is flat in the vicinity surrounding each aperture so that the aperture does not project from the substrate;

a light waveguide path formed in the planar substrate for each minute aperture to guide light toward the recording medium without passing through the minute aperture; and a light source for projecting light through each waveguide path onto the recording medium;

wherein one end of each light waveguide path is disposed at a side of the planar substrate and an opposite end of the light waveguide path is disposed at an edge of a respective minute aperture.

5. The near-field optical memory head according to claim 4; wherein the one end of each light waveguide path is disposed at a surface of the planar substrate opposite a surface thereof at which a respective minute aperture is located; and further comprising a reflective layer for reflecting light passing through each light waveguide path formed on an inner surface of the light waveguide path for reflecting light toward the oppositire end of the light waveguide path at the edge of each minute aperture.

6. The near-field optical memory head according to claim 4; wherein the one end of each light waveguide path is disposed at a surface of the planar substrate opposite a surface thereof at which a respective minute aperture is located.

7. A near-field optical memory head for at least one of recording an reproducing information on a recording medium utilizing near-field light, comprising:

a planar substrate having at least one hole in the shape of an inverted cone or pyramid penetrating therethrough such that one end of each hole constitutes a minute aperture for passing light therethrough;

diffraction gratings formed on the planar substrate at an edge of each hole; and a light source for projecting light onto the diffraction gratings;

wherein the diffraction gratings guide the projected light to an edge of the minute aperture of each hole via the planar substrate, the planar substrate is formed of a material capable of transmitting the projected light therethrough from the diffraction gratings to the minute aperture of each hole, and a light shielding layer is formed on a surface of each hole except at the minute aperture for shielding light from passing therethrough.

8. A near-field optical memory head for at least one of recording and reproducing information on a recording medium utilizing near-field light, comprising:

a planar substrate having at least two holes in the shape of an inverted cone or pyramid penetrating therethrough such that one of the ends of the respective holes constitute minute apertures for passing light therethrough;

diffraction gratings formed at a side of the planar substrate; and a light source for projecting light onto on the diffraction gratings;

wherein the diffraction gratings guide the projected light to an edge of the minute apertures via the planar substrate, the planar substrate is formed of a material capable of transmitting the projected light therethrough, and a light shielding layer is formed on a surface of the respective holes except for the minute apertures for shielding light from passing therethrough.

9. A near-field optical memory head for at least one of recording and reproducing information on a recording medium utilizing near-field light, comprising:

a planar substrate having at least one hole in the shape of an inverted cone or pyramid penetrating therethrough such that one end of each hole constitutes a minute aperture for passing light therethrough;

a light waveguide path formed in the planar substrate along a side of each hole in a depth direction thereof; and light detecting means formed at a first end of each light waveguide path;

wherein a second end of each light waveguide path opposite the first end is disposed at an edge of each minute aperture and a light shielding layer is formed on a surface of the light waveguide path except at the opposite end thereof for shielding light from passing therethrough.

10. A near-field optical memory head according to any one of claims 1, 4, 7, 8 or 9; wherein light reflected by the recording medium in response to irradiation thereof by near-field light is projected through each minute aperture, and light detecting means is disposed proximate each minute aperture to detect the reflected light.

11. A near-field optical memory head for at least one of recording and reproducing information on a recording medium utilizing near-field light, comprising:

a planar substrate having at least one hole in the shape of an inverted cone or pyramid penetrating therethrough such that one end of the hole constitutes a minute aperture for passing light therethrough and the substrate is flat in the vicinity surrounding each aperture so that the aperture does not project from the substrate;

a lens formed at an edge of the minute aperture; and light detecting means formed on an optical axis of the lens on the planar substrate;

wherein the planar substrate is formed of a material capable of transmitting light therethrough from the lens to the light detecting means, and a light shielding layer is formed on a surface of the planar substrate except at the lens for shielding light from passing therethrough.

12. A near-field optical memory head according to claim 11; wherein the lens comprises a refractive index grading having a refractive index which continuously varies.

13. A near-field optical memory head according to claim 11; wherein the refractive index grading lens is formed by conducting selective ion exchange in the planar substrate at an edge of the minute aperture.

14. A near-field optical memory head according to claim 11; wherein the refractive index grading lens is formed by conducting selective ion exchange in the planar substrate before forming the hole, and forming the hole so that a center of the minute aperture is located at an optical axis of the lens.

15. A near-field optical memory head for at least one of recording and reproducing information on a recording medium utilizing near-field light, comprising:

a planar substrate having at least one hole in the shape of an inverted cone or pyramid penetrating therethrough such that one end of each hole constitutes a minute aperture for passing light therethrough and the substrate is flat in the vicinity surrounding each aperture so that the aperture does not project from the substrate, the planar substrate having a light detecting portion therein; and lgith detecting means provided at an edge of each minute aperture; and a light shielding layer formed on a surface of the planar substrate except at the light detecting portion.

16. A near-field optical memory head for at least one of recording and reproducing information on a recording medium utilizing near-field light, comprising:

a planar substrate having at least one hole in the shape of an inverted cone or pyramid penetrating therethrough such that one end of each hole constitutes a minute aperture for passing light therethrough and the substrate is flat in the vicinity surrounding each aperture so that the aperture does not project from the substrate, the planar substrate having a light detecting portion therein; and a light shielding layer formed on a surface of the planar substrate except at the light detecting portion.

17. A near-field optical memory head for at least one of recording and reproducing information on a recording medium utilizing near-field light, comprising: a first substrate; near-field light forming means provided on the first substrate and having a minute aperture for forming near-field light on the recording medium; near-field light detecting means provided on the first substrate for detecting the near-field light; and a second substrate for supporting the first substrate, the first and second substrates being formed from a single substrate such that one of the first substrate and the second substrate projects from an outer peripheral portion of the other one of the first substrate and the second substrate.

18. The near-field optical memory head according to claim 17; wherein the first substrate having the near-field light forming means with the minute aperture for forming the near-field light at the recording medium and the near-field light detecting means for detecting the near-field light is supported at the outer peripheral portion thereof by the second substrate.

19. The near-field optical memory head according to claim 18; wherein the first substrate having the near-field light forming means with the minute aperture for forming the near-field light at the recording medium and the near-field light detecting means for detecting the near-field light is supported at the outer peripheral portion thereof by the second substrate via beams extending from the outer peripheral portion of the first substrate to an inner peripheral portion of the second substrate.

20. The near-field optical memory head according to claim 18; wherein the first substrate is supported at the outer peripheral portion thereof by the second substrate by thinning the single substrate used to form the first substrate and the second substrate to form a thin-wall portion, and solidifying the thin-wall portion after projecting the first substrate is outward from the second substrate.

21. The near-field optical memory head according to claim 19; wherein the beams supporting the first substrate at the outer peripheral portion are thin-walled.

22. The near-field optical memory head according to claim 17; further comprising an output terminal formed on the second substrate for outputting a received optical signal as an electric signal.

23. The near-field optical memory head according to any one of claims 1 through 22; wherein a plurality of the holes are arranged so that data may be simultaneously of recorded to or reproduced from plural recording tracks on the recording medium.

24. An optical memory head for at least one of recording data to an optical recording medium and reading data from the optical recording medium, comprising: a substrate; at least one hole having a tapered sidewall formed in the substrate so as to define a minute aperture at one end of the hole, the substrate being flat in the vicinity surrounding each aperture so that the aperture does not project from the substrate; and an optical waveguide formed in the substrate, one end of the optical waveguide being disposed at an edge of the minute aperture.

25. An optical memory head according to claim 24; further comprising light projecting means for projecting light through the optical waveguide to illuminate the recording medium; and light detecting means for detecting light reflected by the recording medium and passed through the minute aperture.

26. An optical memory head according to claim 24; further comprising diffraction gratings formed in the substrate for directing light through the optical waveguide.

27. An optical memory head according to claim 24; wherein the recording medium has a plurality of tracks, and a plurality of the holes are formed in the substrate in alignment with the plural tracks of the recording medium.

28. An optical memory head according to claim 24; wherein the substrate comprises a first substrate in which the minute aperture is formed, and a second substrate surrounding the first substrate for supporting the first substrate.

29. An optical memory head according to claim 24; wherein the substrate comprises one of a silicon substrate and a transparent substrate.

30. An optical memory head according to claim 24; wherein each minute aperture has a diameter of tens of nanometers.

31. An optical memory head for at least one of recording data to an optical recording medium and reading data from the optical recording medium, comprising: a substrate; at least one hole having a tapered sidewall formed in the substrate so as to define a minute aperture at one end of the hole, the substrate being flat in the vicinity surrounding each aperture so that the aperture does not project from the substrate; light projecting means for projecting light through the hole to illuminate the recording medium; and light detecting means for detecting light reflected by the recording medium.

32. An optical memory head according to claim 31; further comprising a lens for projecting light reflected from the recording medium to the light detecting means.

33. An optical memory head according to claim 31; wherein the recording medium has a plurality of tracks, and a plurality of the holes are formed in the substrate in alignment with the plural tracks of the recording medium.

34. An optical memory head according to claim 31; wherein the substrate comprises a first substrate in which the minute aperture is formed, and a second substrate surrounding the first substrate for supporting the first substrate.

35. An optical memory head according to claim 31; wherein the substrate comprises one of a silicon substrate and a transparent substrate.

36. An optical memory head according to claim 31; wherein each minute aperture has a diameter of tens of nanometers.

* * * * *